Patented July 15, 1924.

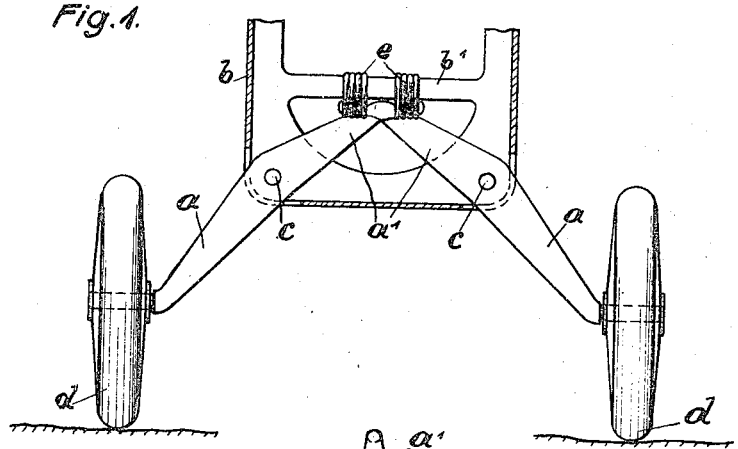
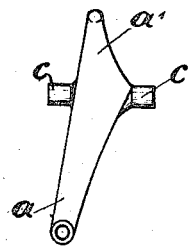
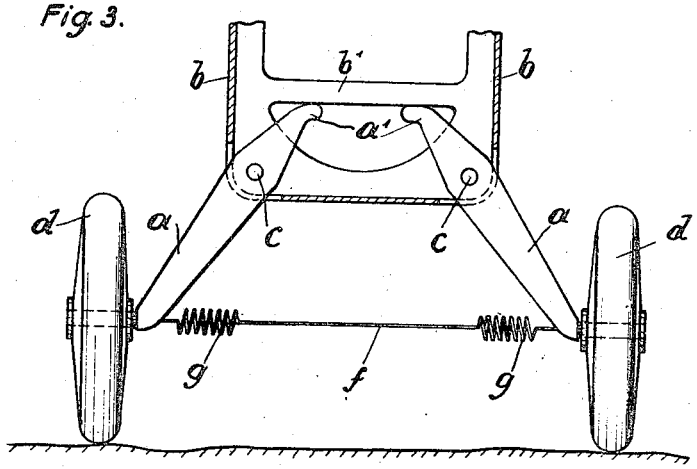

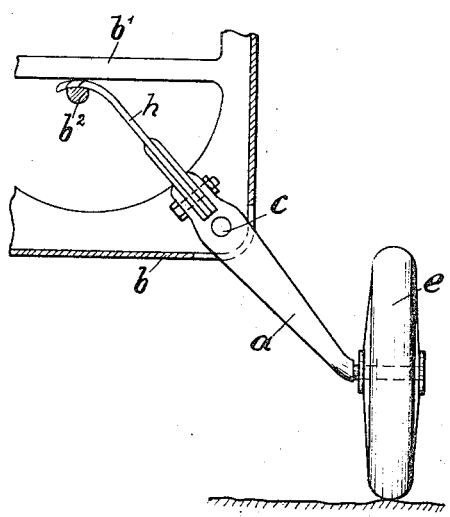
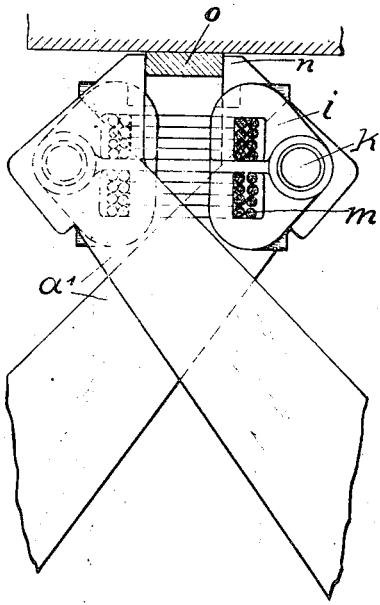
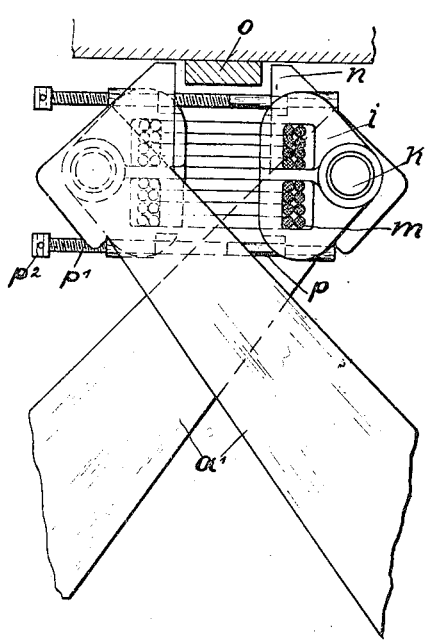
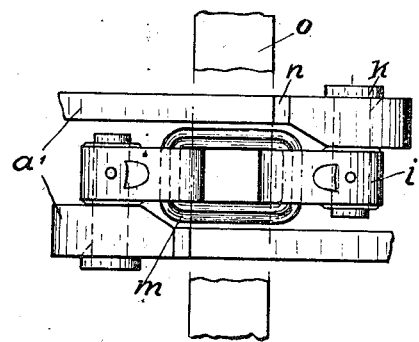

1,501,397

UNITED STATES PATENT OFFICE.

CLAUDIUS DORNIER, OF FRIEDRICHSHAFEN, GERMANY, ASSIGNOR TO THE FIRM: DORNIER METALLBAUTEN GESELLSCHAFT MIT BESCHRÄNKTER HAFTUNG, OF FRIEDRICHSHAFEN, GERMANY.

AIRCRAFT CARRIAGE.

Application filed April 2, 1923. Serial No. 629,413.

*To all whom it may concern:*

Be it known that I, CLAUDIUS DORNIER, a citizen of Germany, residing at Friedrichshafen, Germany, have invented certain new and useful Improvements in Aircraft Carriages, of which the following is a specification.

My invention relates to aircraft and more particularly to the carriages connected therewith.

It is an object of my invention to provide rigid stays connected with the carriage and carrying the wheels, thus avoiding the use of separate elastic wheel axles and the like.

According to my invention each of the rigid stays carrying the wheels and which extend obliquely downwards, is attached to an axle extending parallel with the axis of the flying machine, resilient means being provided either for each stay separately or for both stays in common, the arrangement being such that each stay is free to swing outwards together with the wheel attached thereto against the action of the said resilient means.

Another characteristic feature of the invention consists therein that each stay is provided with a holding member serving for connecting it with said resilient means so that when the stay is moved by the running wheel coming in contact with the ground, the said resilient means are caused to become operative.

I further provide means for facilitating the fixing of the carriage to the body or hull of the machine after the resilient means mentioned have been mounted therein such means preferably consisting in rubber cords which powerfully press the stays, in their position of rest, against the stationary abutments.

The stays extend beyond their axles, these extensions serving either to effect the connection with the resilient means or being themselves elastic.

In the drawings affixed to this specification and forming part thereof several modifications of a device embodying my invention are illustrated diagrammatically by way of example. In the drawings—

Figure 1 is a front view of a carriage constructed according to this invention, the body or hull being shown in section.

Figure 2 is a side-view of one of the stays illustrated in Figure 1.

Figure 3 is an illustration similar to Figure 1 showing a modification.

Figure 4 is an illustration similar to the right hand half of Figure 1 and showing another modification.

Figure 5 is a front view of the upper ends of the stays, in connection with special resilient means, this figure being drawn on a greatly enlarged scale.

Figure 6 is an illustration similar to Figure 5, showing the stays and the resilient means in a different position.

Figure 7 is a plan view of the parts shown in Figures 5 and 6.

Referring to Figures 1 and 2, the carriage stays $a$ are supported on pivots $c$ located in the lower part of the body or hull of the flying machine and extending in parallel to the longitudinal axis thereof; they carry at their lower ends the wheels $d$. The stays $a$ extend beyond the pivots $c$ and their elongations $a^1$ are connected with resilient members $e$ which, in the example shown in Figure 1, consist of rubber cords $e$ such as generally used in connection with flying machines. The rubber cords $e$ are wound around the upper ends of the extensions $a^1$ as well as around a cross stay $b^1$ of the body or hull $b$ of the flying machine.

In the modification shown in Figure 3 the rubber convolutions $e$ of Figure 1 are replaced by a rod, rope or the like $f$ which extends from one wheel journal to the other and into which springs $g$ are inserted. The parts $g\ f\ g$ form a direct connection between the lower arms of the stays $a, a$. The springs $g\ g$ may, however, be dispensed with if the member $f$ itself consists of a resilient material.

Whilst the extension $a^1$ of Figures 1–3 are rigid, those shown in Figure 4 are elastic, in that they are formed by springs $h$. Each of these springs abuts against a stationary part or member $b^1$ of the body or hull of the flying machine, and a pin or other member $b^2$ may be provided by which the springs $h$ are held in place.

A particularly suitable manner of provid ing the carriage stays with shock-absorbing means is illustrated in Figures 5-7. It consists in attaching special holding members $i$ to each of the upwardly extending elongations $a^1$ of the stays $a$, said members being secured in place, for instance, by pivots $k$. These holding members are provided with apertures, permitting of the introduction of rubber cords $m$, in such a manner, that with the aid of these cords a resilient connection is established between the two holding members. The extensions $a^1$ cross each other, and, in the position of rest of the stays, a lug $n$ provided at the upper end of each extension contacts with a stationary abutment $o$ provided at the hull.

On the wheels meeting the ground, the lugs $n$ the abutment $o$, and the shock-absorbing means, i. e. the rubber cords, come into operation. In order to facilitate the mounting of the carriage stays means are provided which permit temporarily moving asunder the holding members. I prefer using screws $p$—having a long threaded portion $p^1$ with a square head $p^2$, the other portion of each screw $p$ serving for fastening it in the holding member and being reduced in diameter in comparison to the threaded part $p^1$, so that each of the threaded bolts abuts against the other holding member by means of a shoulder. The holding members are provided with suitable bores for the bolts $p$ $p$, and the bores of one of these members are provided with internal threads corresponding to the external threads of the bolts.

When the bolts are introduced into the respective bores and are screwed forward sufficiently, the holding members $i$ are compelled to move away from one another, overcoming the elasticity of the rubber cords $m$, as disclosed in Figure 6. With this position of the holding members the mounting of the carriage is considerably facilitated. The mounting being effected the bolts $p$ may be removed. However, there may occur cases in the practical use of the invention in which the subsequent removal of the bolts is not necessary.

I wish it to be understood that I do not desire to be limited to the exact details of construction shown or described, for obvious modifications will occur to a person skilled in the art.

I claim:
1. Aircraft carriage comprising in combination, a hull, a pair of upwardly converging double-armed levers pivoted to said hull for rocking motion in a plane transversely to the longitudinal axis of said hull, a wheel at the lower end of each lever and shock absorbing means connected with the upper ends of said levers and adapted to counteract the spreading outwards of said wheels.

2. Aircraft carriage comprising in combination, a hull, a pair of upwardly converging double-armed levers pivoted to said hull for rocking motion in a plane transversely to the longitudinal axis of said hull, a wheel at the lower end of each lever and tensionally strainable shock absorbing means connected with the upper ends of said levers and adapted to counteract the spreading outwards of said wheels.

3. Aircraft carriage comprising in combination, a hull, a pair of upwardly converging double-armed levers pivoted to said hull for rocking motion in a plane transversely to the longitudinal axis of said hull, a wheel at the lower end of each lever, the upper ends being inter-crossed and shock absorbing means connected with the upper ends of said levers and adapted to counteract the spreading outwards of said wheels.

4. Aircraft carriage comprising in combination, a hull, a pair of upwardly converging double-armed levers pivoted to said hull for rocking motion in a plane transversely to the longitudinal axis of said hull, a wheel at the lower end of each lever, the upper ends being inter-crossed and tensionally strainable shock absorbing means connected with the upper ends of said levers and adapted to counteract the spreading outwards of said wheels.

5. Aircraft carriage comprising in combination, a hull, a pair of upwardly converging double-armed levers pivoted to said hull for rocking motion in a plane transversely to the longitudinal axis of said hull, a wheel at the lower end of each lever, the upper ends being inter-crossed, eyes pivoted to said upper ends and tensionally strainable shock absorbing means connecting said eyes.

In testimony whereof I affix my signature.

CLAUDIUS DORNIER.